(12) United States Patent
Vasseur et al.

(10) Patent No.: US 10,375,565 B2
(45) Date of Patent: Aug. 6, 2019

(54) DYNAMIC REROUTING OF WIRELESS TRAFFIC BASED ON INPUT FROM MACHINE LEARNING-BASED MOBILITY PATH ANALYSIS

(71) Applicant: Cisco Technology, Inc., San Jose, CA (US)

(72) Inventors: Jean-Philippe Vasseur, Saint Martin D'uriage (FR); Vinay Kumar Kolar, San Jose, CA (US); Santosh Pandey, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/783,342

(22) Filed: Oct. 13, 2017

(65) Prior Publication Data

US 2019/0116485 A1    Apr. 18, 2019

(51) Int. Cl.
| | | |
|---|---|---|
| *H04W 8/00* | (2009.01) | |
| *H04W 8/08* | (2009.01) | |
| *H04W 24/04* | (2009.01) | |
| *H04W 28/04* | (2009.01) | |

(52) U.S. Cl.
CPC .......... *H04W 8/082* (2013.01); *H04W 8/005* (2013.01); *H04W 24/04* (2013.01); *H04W 28/04* (2013.01)

(58) Field of Classification Search
CPC ......... H04W 48/18; H04W 8/06; H04W 8/12; H04W 8/183; H04W 8/26; H04W 12/06; H04W 60/00; H04W 60/04; H04W 8/04; H04W 36/14; H04W 48/16; H04W 88/06; H04W 36/08; H04W 36/12; H04W 36/18; H04W 36/30; H04W 16/32; H04W 36/04; H04W 36/32; H04W 64/006; H04W 4/16; H04W 76/02; H04W 92/02; G01S 11/10
See application file for complete search history.

(56) References Cited

U.S. PATENT DOCUMENTS

| | | | | |
|---|---|---|---|---|
| 6,603,968 B2* | 8/2003 | Anvekar | ............... | H04W 8/183 455/433 |
| 7,400,605 B2* | 7/2008 | Palmer | .............. | H04W 36/0085 370/333 |

(Continued)

OTHER PUBLICATIONS

Gálvez, et al., "A Feedback based Adaptive Online Algorithm for Multi Gateway Load Balancing in wireless mesh networks", 2010 IEEE International Symposium on a World of Wireless Mobile and Multimedia Networks (WoWMoM), 9 pages, 2010, IEEE.

*Primary Examiner* — Sharad Rampuria
(74) *Attorney, Agent, or Firm* — Behmke Innovation Group LLC; James Behmke; Stephen D. LeBarron

(57) ABSTRACT

In one embodiment, a service receives data indicative of roaming failures along mobility paths in a network. The mobility paths represent ordered series of wireless access points via which wireless clients have accessed the network over time. The service uses, based on the data indicative of the roaming failures, a machine learning-based model to associate mobility path failure metrics with portions of the mobility paths. The service identifies, for a first mobility path, an alternate mobility path that has a lower mobility path failure metric than that of the first mobility path. The service triggers a mobility path reroute for a particular client device in the network on the first mobility path to the alternate mobility path.

18 Claims, 12 Drawing Sheets

(56) References Cited

U.S. PATENT DOCUMENTS

| | | | |
|---|---|---|---|
| 7,808,918 B2 * | 10/2010 | Bugenhagen | H04L 47/22 370/229 |
| 9,363,714 B2 | 6/2016 | Rahman et al. | |
| 2015/0189554 A1 * | 7/2015 | Rahman | H04W 36/0055 455/438 |

* cited by examiner

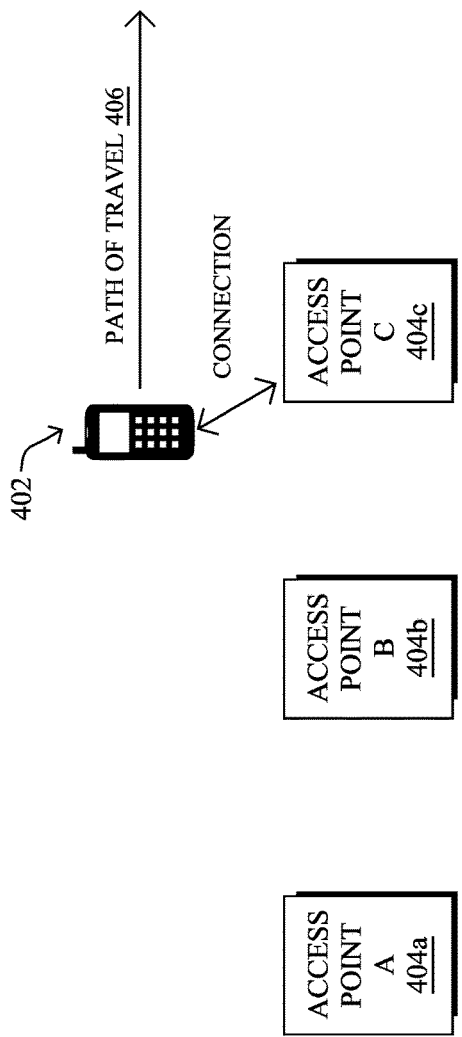
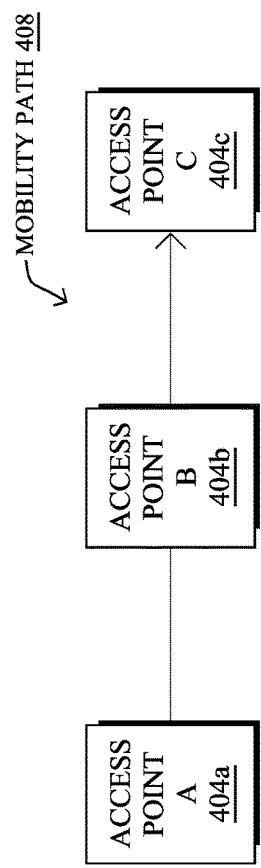
FIG. 4C
FIG. 4D

DYNAMIC REROUTING OF WIRELESS TRAFFIC BASED ON INPUT FROM MACHINE LEARNING-BASED MOBILITY PATH ANALYSIS

TECHNICAL FIELD

The present disclosure relates generally to computer networks, and, more particularly, to the dynamic rerouting of wireless traffic based on input from machine learning-based mobility path analysis.

BACKGROUND

In most wireless networks, such as Wi-Fi networks, roaming is a fairly common event. Generally, roaming refers to a client device transitioning from one wireless access point (AP) to another. Notably, roaming is often caused by the client device attempting to connect to the "best" AP available in the location of the client. The "best" AP from the standpoint of the client device may change over time due to movement of the client, changes in the environment that affect the signal (e.g., in terms of strength, signal to noise ratio, etc.), or other such factors.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 4A-4E illustrate examples of a mobility path in a network;

DESCRIPTION OF EXAMPLE EMBODIMENTS

Overview

Figure 1A:
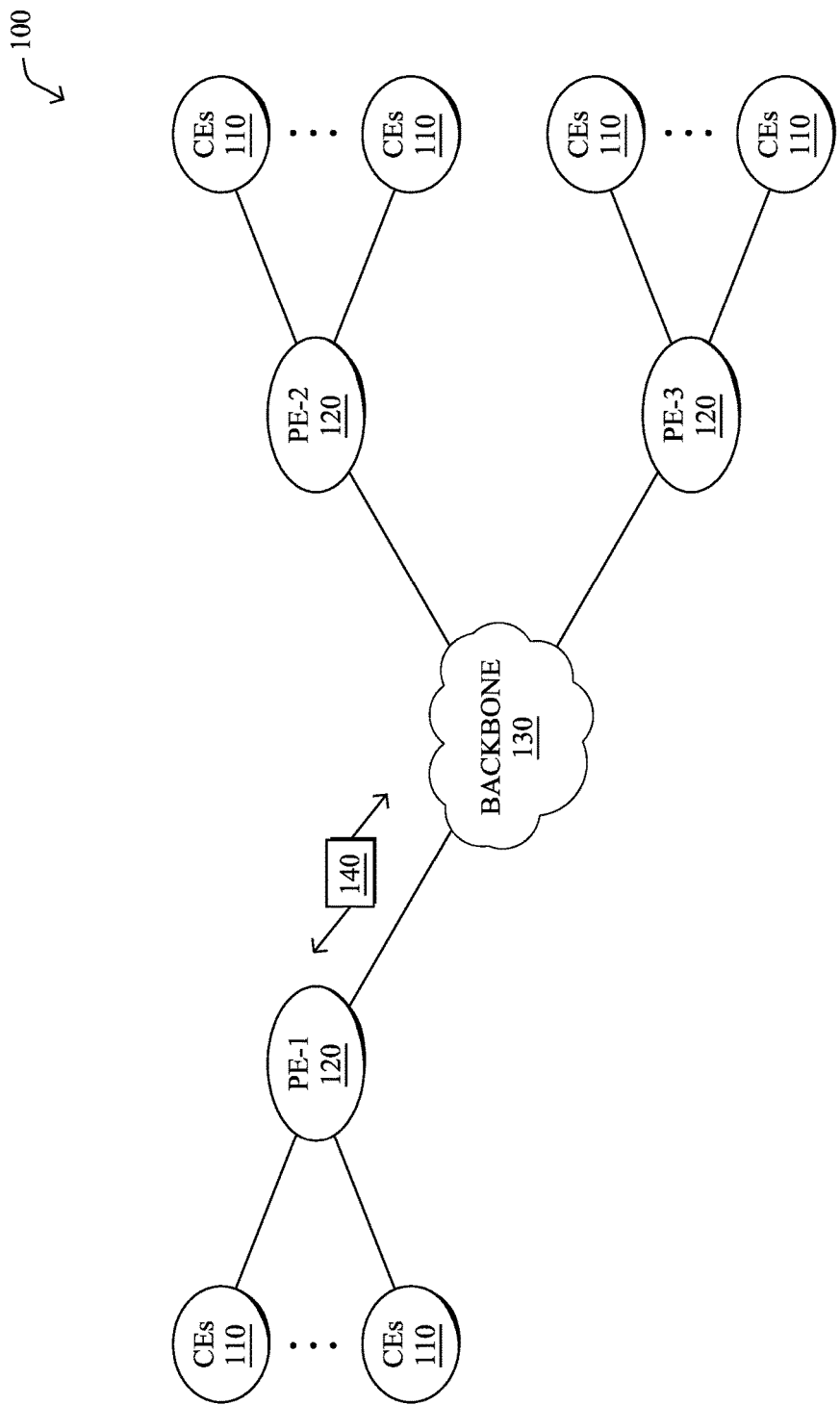
FIGS. 1A-1B illustrate an example communication network.

According to one or more embodiments of the disclosure, a service receives data indicative of roaming failures along mobility paths in a network. The mobility paths represent ordered series of wireless access points via which wireless clients have accessed the network over time. The service uses, based on the data indicative of the roaming failures, a machine learning-based model to associate mobility path failure metrics with portions of the mobility paths. The service identifies, for a first mobility path, an alternate mobility path that has a lower mobility path failure metric than that of the first mobility path. The service triggers a mobility path reroute for a particular client device in the network on the first mobility path to the alternate mobility path.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
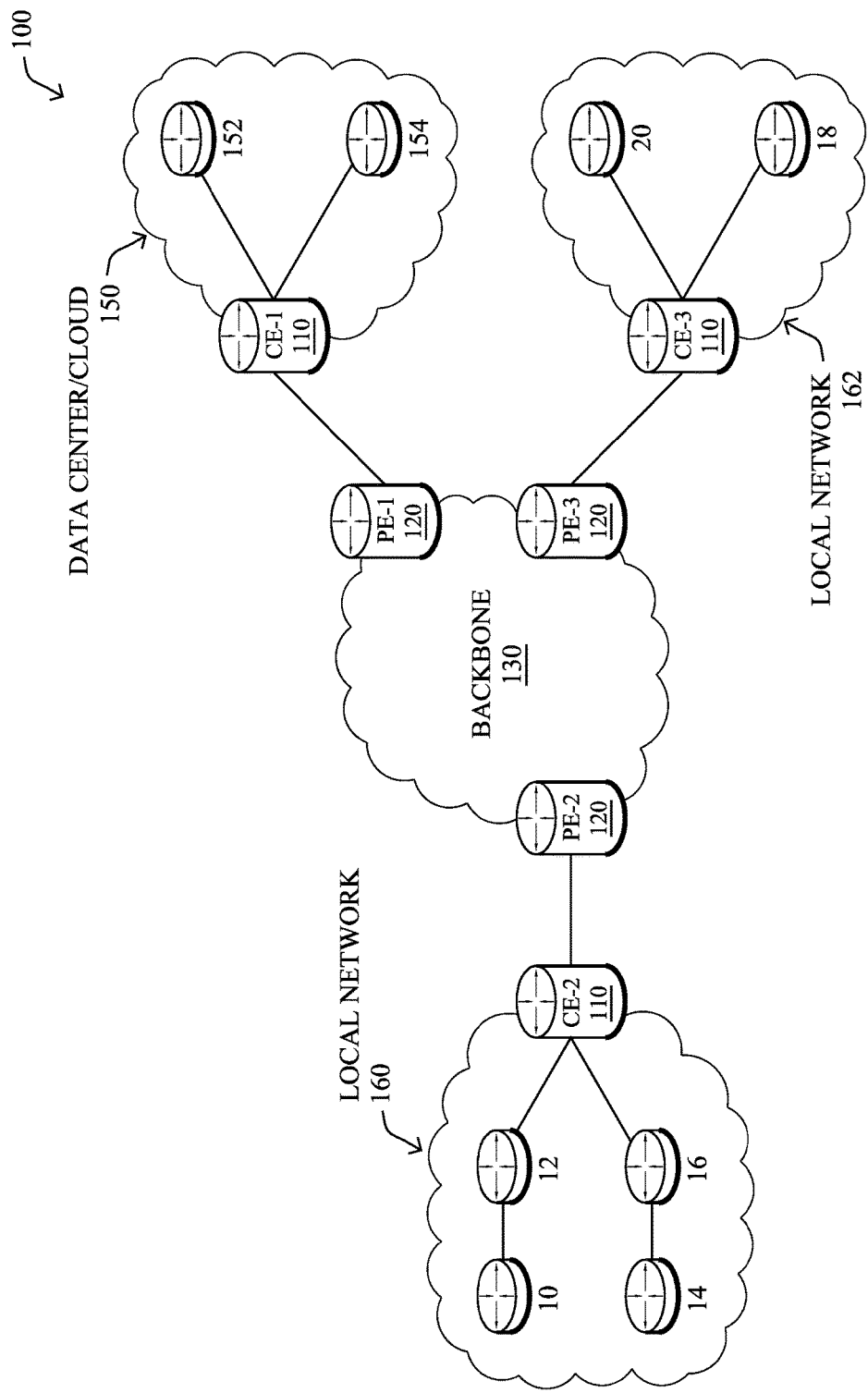

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
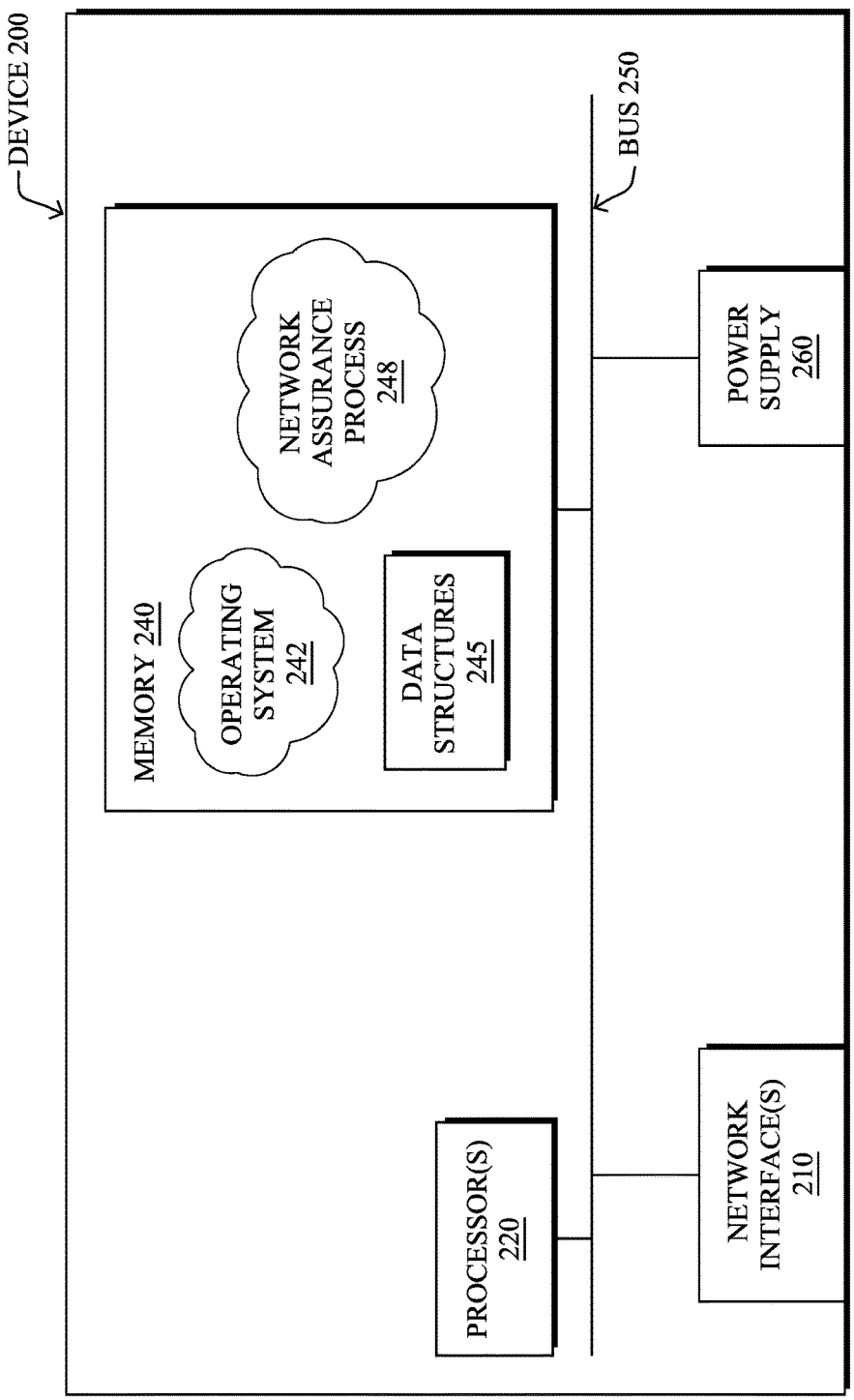
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a network assurance process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Network assurance process 248 includes computer executable instructions that, when executed by processor(s) 220, cause device 200 to perform network assurance functions as part of a network assurance infrastructure within the network. In general, network assurance refers to the branch of networking concerned with ensuring that the network provides an acceptable level of quality in terms of the user experience. For example, in the case of a user participating in a videoconference, the infrastructure may enforce one or more network policies regarding the videoconference traffic, as well as monitor the state of the network, to ensure that the user does not perceive potential issues in the network (e.g., the video seen by the user freezes, the audio output drops, etc.).

In some embodiments, network assurance process 248 may use any number of predefined health status rules, to enforce policies and to monitor the health of the network, in view of the observed conditions of the network. For example, one rule may be related to maintaining the service usage peak on a weekly and/or daily basis and specify that if the monitored usage variable exceeds more than 10% of the per day peak from the current week AND more than 10% of the last four weekly peaks, an insight alert should be triggered and sent to a user interface.

Another example of a health status rule may involve client transition events in a wireless network. In such cases, whenever there is a failure in any of the transition events, the wireless controller may send a reason_code to the assurance system. To evaluate a rule regarding these conditions, the network assurance system may then group 150 failures into different "buckets" (e.g., Association, Authentication, Mobility, DHCP, WebAuth, Configuration, Infra, Delete, De-Authorization) and continue to increment these counters per service set identifier (SSID), while performing averaging every five minutes and hourly. The system may also maintain a client association request count per SSID every five minutes and hourly, as well. To trigger the rule, the system may evaluate whether the error count in any bucket has exceeded 20% of the total client association request count for one hour.

In various embodiments, network assurance process 248 may also utilize machine learning techniques, to enforce policies and to monitor the health of the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, network assurance process 248 may employ one or more supervised, unsupervised, or semi-supervised machine learning models. Generally, supervised learning entails the use of a training set of data, as noted above, that is used to train the model to apply labels to the input data. For example, the training data may include sample network observations that do, or do not, violate a given network health status rule and are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that network assurance process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted whether a network health status rule was violated. Conversely, the false negatives of the model may refer to the number of times the model predicted that a health status rule was not violated when, in fact, the rule was violated. True negatives and positives may refer to the number of times the model correctly predicted whether a rule was violated or not violated, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
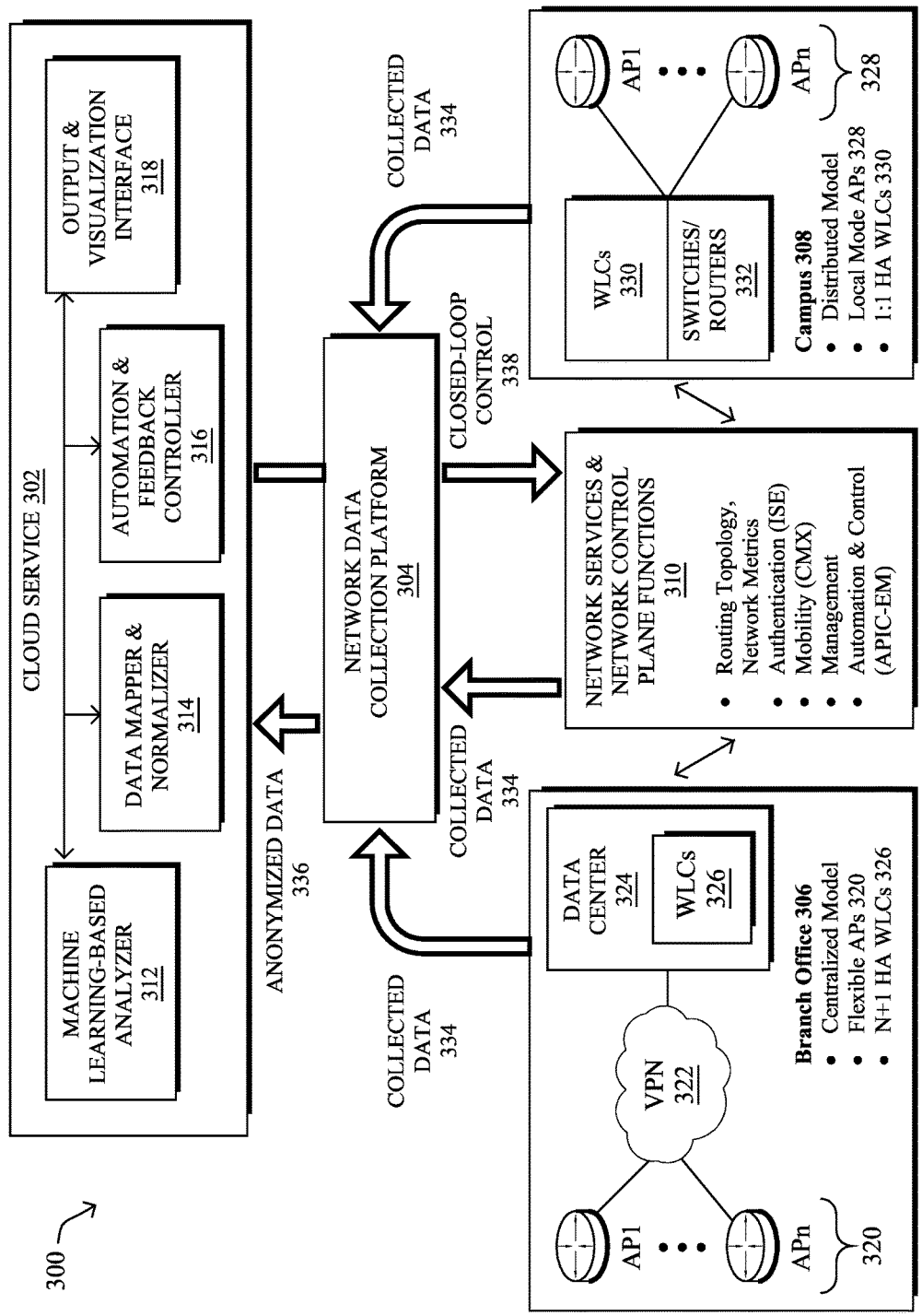
FIG. 3 illustrates an example network assurance system.

FIG. 3 illustrates an example network assurance system 300, according to various embodiments. As shown, at the core of network assurance system 300 may be a cloud service 302 that leverages machine learning in support of cognitive analytics for the network, predictive analytics (e.g., models used to predict user experience, etc.), troubleshooting with root cause analysis, and/or trending analysis for capacity planning. Generally, architecture 300 may support both wireless and wired network, as well as LLNs/IoT networks.

In various embodiments, cloud service 302 may oversee the operations of the network of an entity (e.g., a company, school, etc.) that includes any number of local networks. For example, cloud service 302 may oversee the operations of the local networks of any number of branch offices (e.g., branch office 306) and/or campuses (e.g., campus 308) that may be associated with the entity. Data collection from the various local networks/locations may be performed by a network data collection platform 304 that communicates with both cloud service 302 and the monitored network of the entity.

The network of branch office 306 may include any number of wireless access points 320 (e.g., a first access point AP1 through nth access point, APn) through which endpoint nodes may connect. Access points 320 may, in turn, be in communication with any number of wireless LAN controllers (WLCs) 326 located in a centralized datacenter 324. For example, access points 320 may communicate with WLCs 326 via a VPN 322 and network data collection platform 304 may, in turn, communicate with the devices in datacenter 324 to retrieve the corresponding network feature data from access points 320, WLCs 326, etc. In such a centralized model, access points 320 may be flexible access points and WLCs 326 may be N+1 high availability (HA) WLCs, by way of example.

Conversely, the local network of campus 308 may instead use any number of access points 328 (e.g., a first access point AP1 through nth access point APm) that provide connectivity to endpoint nodes, in a decentralized manner. Notably, instead of maintaining a centralized datacenter, access points 328 may instead be connected to distributed WLCs 330 and switches/routers 332. For example, WLCs 330 may be 1:1 HA WLCs and access points 328 may be local mode access points, in some implementations.

To support the operations of the network, there may be any number of network services and control plane functions 310. For example, functions 310 may include routing topology and network metric collection functions such as, but not limited to, routing protocol exchanges, path computations, monitoring services (e.g., NetFlow or IPFIX exporters), etc. Further examples of functions 310 may include authentication functions, such as by an Identity Services Engine (ISE) or the like, mobility functions such as by a Connected Mobile Experiences (CMX) function or the like, management functions, and/or automation and control functions such as by an APIC-Enterprise Manager (APIC-EM).

During operation, network data collection platform 304 may receive a variety of data feeds that convey collected data 334 from the devices of branch office 306 and campus 308, as well as from network services and network control plane functions 310. Example data feeds may comprise, but are not limited to, management information bases (MIBS) with Simple Network Management Protocol (SNMP)v2, JavaScript Object Notation (JSON) Files (e.g., WSA wireless, etc.), NetFlow/IPFIX records, logs reporting in order to collect rich datasets related to network control planes (e.g., Wi-Fi roaming, join and authentication, routing, QoS, PHY/MAC counters, links/node failures), traffic characteristics, and other such telemetry data regarding the monitored network. As would be appreciated, network data collection platform 304 may receive collected data 334 on a push and/or pull basis, as desired. Network data collection platform 304 may prepare and store the collected data 334 for processing by cloud service 302. In some cases, network data collection platform may also anonymize collected data 334 before providing the anonymized data 336 to cloud service 302.

In some cases, cloud service 302 may include a data mapper and normalizer 314 that receives the collected and/or anonymized data 336 from network data collection platform 304. In turn, data mapper and normalizer 314 may map and normalize the received data into a unified data model for further processing by cloud service 302. For example, data mapper and normalizer 314 may extract certain data features from data 336 for input and analysis by cloud service 302.

In various embodiments, cloud service 302 may include a machine learning-based analyzer 312 configured to analyze the mapped and normalized data from data mapper and normalizer 314. Generally, analyzer 312 may comprise a power machine learning-based engine that is able to understand the dynamics of the monitored network, as well as to predict behaviors and user experiences, thereby allowing cloud service 302 to identify and remediate potential network issues before they happen.

Machine learning-based analyzer 312 may include any number of machine learning models to perform the techniques herein, such as for cognitive analytics, predictive analysis, and/or trending analytics as follows:

Cognitive Analytics Model(s):
  The aim of cognitive analytics is to find behavioral patterns in complex and unstructured datasets. For the sake of illustration, analyzer 312 may be able to extract patterns of Wi-Fi roaming in the network and roaming behaviors (e.g., the "stickiness" of clients to APs 320, 328, "ping-pong" clients, the number of visited APs 320, 328, roaming triggers, etc). Analyzer 312 may characterize such patterns by the nature of the device (e.g., device type, OS) according to the place in the network, time of day, routing topology, type of AP/WLC, etc., and potentially correlated with other network metrics (e.g., application, QoS, etc.). In another example, the cognitive analytics model(s) may be configured to extract AP/WLC related patterns such as the number of clients, traffic throughput as a function of time, number of roaming processed, or the like, or even end-device related patterns (e.g., roaming patterns of iPhones, IoT Healthcare devices, etc.).

Predictive Analytics Model(s):

These model(s) may be configured to predict user experiences, which is a significant paradigm shift from reactive approaches to network health. For example, in a Wi-Fi network, analyzer 312 may be configured to build predictive models for the joining/roaming time by taking into account a large plurality of parameters/observations (e.g., RF variables, time of day, number of clients, traffic load, DHCP/DNS/Radius time, AP/WLC loads, etc.). From this, analyzer 312 can detect potential network issues before they happen. Furthermore, should abnormal joining time be predicted by analyzer 312, cloud service 312 will be able to identify the major root cause of this predicted condition, thus allowing cloud service 302 to remedy the situation before it occurs. The predictive analytics model(s) of analyzer 312 may also be able to predict other metrics such as the expected throughput for a client using a specific application. In yet another example, the predictive analytics model(s) may predict the user experience for voice/video quality using network variables (e.g., a predicted user rating of 1-5 stars for a given session, etc.), as function of the network state. As would be appreciated, this approach may be far superior to traditional approaches that rely on a mean opinion score (MOS). In contrast, cloud service 302 may use the predicted user experiences from analyzer 312 to provide information to a network administrator or architect in real-time and enable closed loop control over the network by cloud service 302, accordingly. For example, cloud service 302 may signal to a particular type of endpoint node in branch office 306 or campus 308 (e.g., an iPhone, an IoT healthcare device, etc.) that better QoS will be achieved if the device switches to a different AP 320 or 328.

Trending Analytics Model(s):

The trending analytics model(s) may include multivariate models that can predict future states of the network, thus separating noise from actual network trends. Such predictions can be used, for example, for purposes of capacity planning and other "what-if" scenarios.

Machine learning-based analyzer 312 may be specifically tailored for use cases in which machine learning is the only viable approach due to the high dimensionality of the dataset and patterns cannot otherwise be understood and learned. For example, finding a pattern so as to predict the actual user experience of a video call, while taking into account the nature of the application, video CODEC parameters, the states of the network (e.g., data rate, RF, etc.), the current observed load on the network, destination being reached, etc., is simply impossible using predefined rules in a rule-based system.

Unfortunately, there is no one-size-fits-all machine learning methodology that is capable of solving all, or even most, use cases. In the field of machine learning, this is referred to as the "No Free Lunch" theorem. Accordingly, analyzer 312 may rely on a set of machine learning processes that work in conjunction with one another and, when assembled, operate as a multi-layered kernel. This allows network assurance system 300 to operate in real-time and constantly learn and adapt to new network conditions and traffic characteristics. In other words, not only can system 300 compute complex patterns in highly dimensional spaces for prediction or behavioral analysis, but system 300 may constantly evolve according to the captured data/observations from the network.

Cloud service 302 may also include output and visualization interface 318 configured to provide sensory data to a network administrator or other user via one or more user interface devices (e.g., an electronic display, a keypad, a speaker, etc.). For example, interface 318 may present data indicative of the state of the monitored network, current or predicted issues in the network (e.g., the violation of a defined rule, etc.), insights or suggestions regarding a given condition or issue in the network, etc. Cloud service 302 may also receive input parameters from the user via interface 318 that control the operation of system 300 and/or the monitored network itself. For example, interface 318 may receive an instruction or other indication to adjust/retrain one of the models of analyzer 312 from interface 318 (e.g., the user deems an alert/rule violation as a false positive).

In various embodiments, cloud service 302 may further include an automation and feedback controller 316 that provides closed-loop control instructions 338 back to the various devices in the monitored network. For example, based on the predictions by analyzer 312, the evaluation of any predefined health status rules by cloud service 302, and/or input from an administrator or other user via input 318, controller 316 may instruct an endpoint client device, networking device in branch office 306 or campus 308, or a network service or control plane function 310, to adjust its operations (e.g., by signaling an endpoint to use a particular AP 320 or 328, etc.).

As noted above, in many wireless networks, such as Wi-Fi networks, roaming is a fairly common event. Roaming can be triggered by mobility of the client device whereby the client tries to always connect to the best Access point (AP) or, sometimes, simply because the client determines that the current AP is not the best AP. Notably, even when the client is not currently moving, signal strength, signal to noise ratio (SNR), etc. may change (e.g., due to changing environmental conditions. In almost all forms of wireless networks, with the exception of DETNET and the like, roaming decisions are made by the client device.

The process of roaming in a wireless network is by far not "free" and could be highly subject to issues, thus leading to connectivity loss and application disruption. There are different types of roaming (e.g., intra-WLC, layer-2, layer-3, etc.) that potentially require a series of steps to successfully complete for the roaming to succeed: association, (re)authentication, rekeying the Group Temporal Key (GTK), de-authentication, DHCP operations, and the like. In other words, there are a number of possible ways in which roaming can fail in a wireless network. Accordingly, the large number of roaming events that typically occur in a wireless network, as well as the numerous conditions that can lead to roaming failures, can often impinge on the user experience.

Dynamic Rerouting of Wireless Traffic Based on Input from Machine Learning-Based Mobility Path Analysis The techniques herein introduce a mechanism that helps to reduce and/or eliminate roaming failures in a wireless network. In some aspects, the techniques herein introduce the concept of mobility path metrics used to evaluate the risk of failure when roaming in a wireless network. In another aspect, a central path computation engine (PCE) may gather information regarding the roaming events in the network and leverage machine learning to compute and associate a mobility failure metric with the mobility path. Such a metric may then be used as a signal to constrain the mobility paths based on their risk of failure. In further aspects, information regarding the mobility paths and their failure metrics may be provided to client devices on request, such as when the client joins the wireless network or on detection of a special event (e.g., to perform a fast reroute using the techniques herein). Note that although the techniques herein are described primarily with respect to Wi-Fi networks, the techniques herein are equally applicable in other networks such as, but not limited to, cellular network (e.g., 4G, 5G, LTE, etc.), IoT networks that use 802.15.4 with the techniques herein adapted to take into account the local ETX of such links, and any other wireless network that supports roaming.

Specifically, according to one or more embodiments of the disclosure as described in detail below, a service receives data indicative of roaming failures along mobility paths in a network. The mobility paths represent ordered series of wireless access points via which wireless clients have accessed the network over time. The service uses, based on the data indicative of the roaming failures, a machine learning-based model to associate mobility path failure metrics with portions of the mobility paths. The service identifies, for a first mobility path, an alternate mobility path that has a lower mobility path failure metric than that of the first mobility path. The service triggers a mobility path reroute for a particular client device in the network on the first mobility path to the alternate mobility path.

Illustratively, the techniques described herein may be performed by hardware, software, and/or firmware, such as in accordance with the network assurance process 248, which may include computer executable instructions executed by the processor 220 (or independent processor of interfaces 210) to perform functions relating to the techniques described herein.

Operationally, the concept of a mobility path in a network is introduced herein. In contrast with a data plane path, a mobility path generally refers to the list of APs that a client device visits/attaches to in a given period. As would be appreciated, an access point may be a Wi-Fi AP, a gateway in the context of the IoT, a base station, or any other networking device that communicates wirelessly with a client device and provides the client device access to the wireless network. In some cases, a given mobility path may be defined as an ordered set of three or more AP nodes. In other words, a mobility path is a control plane path that is not followed by the data, but by the client device itself. Accordingly, a mobility path failure herein generally refers to an unsuccessful roaming event. Such failed roaming events often lead to traffic disruptions, similar to a data path failure.

Figure 4A:
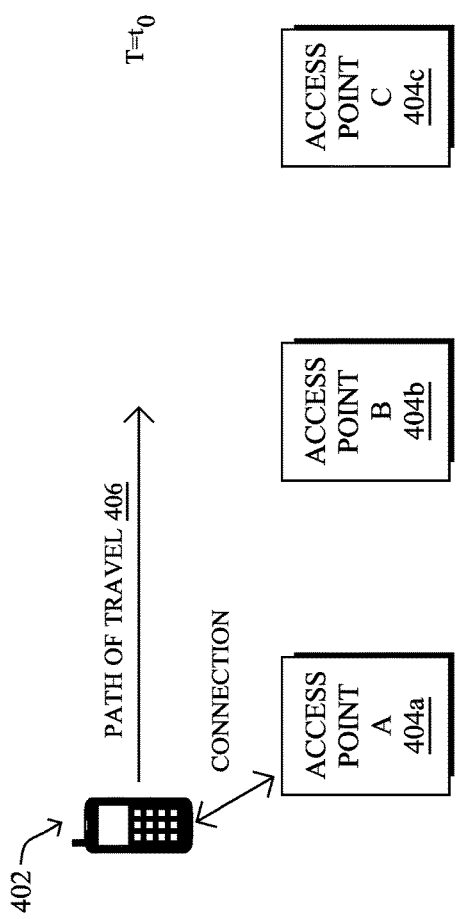

FIGS. 4A-4E illustrate examples of a mobility path in a network, according to various embodiments. In FIG. 4A, assume that a client device 402 is a mobile device that is traveling along a path of travel 406. As would be appreciated, while path of travel 406 is depicted as a linear path, the movement of a mobile device in most situations will not be linear and may vary in one, two, or even three dimensions. For purposes of illustration, assume that the local network comprises APs 404, such as APs 404*a*-404*c* (e.g., APs A-C), as shown. At time T=t₀, client device 402 may be connected to the wireless network via AP 404*a*, which may be the closest AP 404 to client device 402 at this time or, alternatively, offer the best characteristics in terms of signal strength, SNR, etc.

Figure 4B:
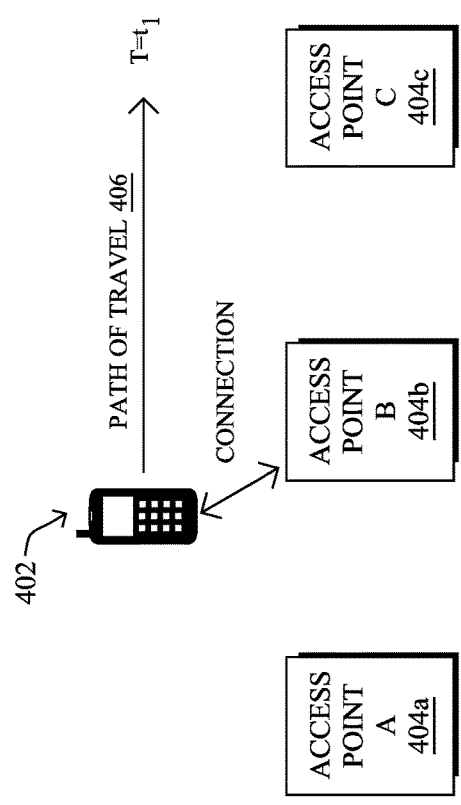

In FIG. 4B, assume now that client device 402 has moved along path of travel 406 and is now closer to AP 404*b* at time T=t₁. If the wireless characteristics of AP 404*b*, from the standpoint of client device 402, are now better than that of AP 404*a*, client device 402 may initiate roaming. As a result, client device 402 may attach itself to AP 404*b* and detach itself from AP 404*a*, thereby completing the roaming operation. After attaching to AP 404*b*, client device 402 may continue to communicate with the network as normal via AP 404*b*.

In FIG. 4C, client device 402 may perform a similar operation as in FIG. 4C, but with AP 404*c*. Notably, assume now that at time T=t₂, client device 402 is now within closest proximity to AP 404*c* and/or that AP 404*c* offers the best characteristics, from the perspective of client device 402. In such a case, client device 402 may initiate another roaming operation, thereby switching its access from AP 404*b* to AP 404*c*.

FIG. 4D illustrates the concept of a mobility path 408, according to various embodiments. Based on the movement and wireless roaming operations of client device 402 over time (e.g., between times T=t₀ and T=t₂), as depicted in FIG. 4A-4C, client device 402 can be viewed as having traversed mobility path 408. More specifically, mobility path 408 may be a directed (or directionless) set of nodes/APs 404 through which the client device 402 roamed in the network. In this sense, roaming events between the APs 404 can be viewed akin to hops between nodes in a communication data path.

Figure 4E:
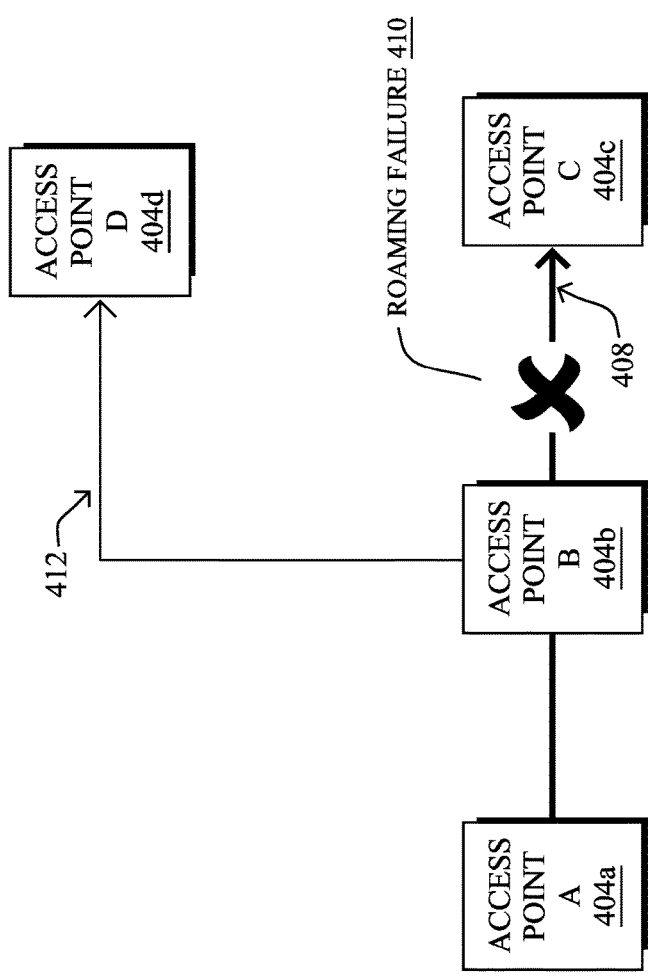

FIG. 4E illustrates an example of a roaming failure, according to various embodiments. Assume that the network assurance system has identified mobility path 408 by monitoring the roaming events for the various client devices in the network. Further, assume that client device 412 first attached to AP 404*a* and then to AP 404*b*. Thus, the network assurance system may determine that client device 412 is on mobility path 408 and will next roam to AP 404*c*. However, instead of roaming to AP 404*c*, as expected, client device 412 newly attaches to AP 404*d* because of an inability to connect to AP 404*c*. In this case, mobility path 408 can be said to have experienced a roaming failure 410, since client device 412 was unable to successfully roam to AP 404*c*. If client device 412 was participating in an online session at the time, roaming failure 410 could result in a loss of connectivity for client device 412 and impact the user experience of the user of client device 402. For example, if client device 412 is participating in an online conference, loss of network connectivity due to roaming failure 410 could cause client device 412 to stop receiving the conference stream.

Figure 5:
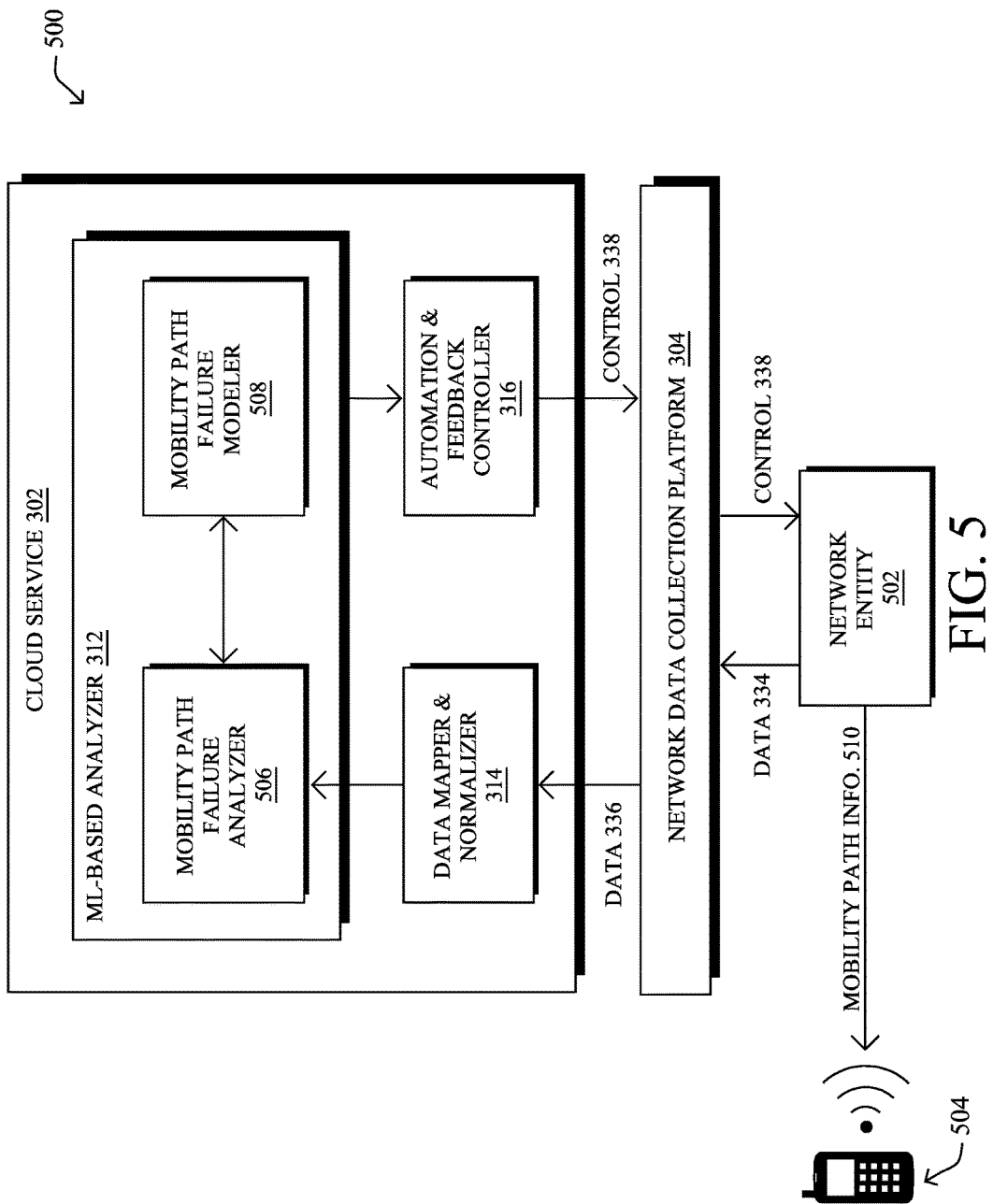
FIG. 5 illustrates an example architecture for performing mobility path analysis in a network assurance system.

FIG. 5 illustrates an example architecture 500 for performing mobility path analysis in a network assurance system, according to various embodiments. In general, architecture 500 may include any or all of the following components: a mobility path analyzer 506 and/or a mobility path failure modeler 508. In various embodiments, the components of architecture 500 may be implemented within a network assurance system, such as system 300 shown in FIG. 3. Accordingly, the components 506-508 of architecture 500 shown may be implemented as part of cloud service 302, as part of network data collection platform 304, and/or on one or more network elements/entities 502 within the monitored network itself. For example, mobility path analyzer 506 and mobility path failure modeler 508 may be implemented as part of machine learning-based analyzer 312, in some embodiments, as shown. Further, these components may be implemented in a distributed manner or implemented as its own stand-alone service, either as part of the local network under observation or as a remote service. In addition, the functionalities of the components of architecture 500 may be combined, omitted, or implemented as part of other processes, as desired.

During operation, a client device 504 may leverage one or more of network entities 502, to communicate wirelessly with the local network. For example, network entities 502 may include wireless APs, WLC, switches, routers, or the like, that provide network connectivity to client device 504. In turn, network entities 502 may report information regarding the roaming and other wireless conditions associated with client device 504 to network data collection platform 304 as part of data 334. Network data collection platform 304 may then pass this data on to cloud service 302 for analysis by machine learning (ML)-based analyzer 312.

A function of architecture 500 involves the notion of a mobility path objective function and a mobility failure metric for such paths. With respect to communicating data throughout a network, an objective function may control the routing paths traversed by the data. Notably, in the context of IP or MPLS networks, routing metrics can be used in objective functions (e.g., find the shortest constrained path given a specific metric, which can reflect the bandwidth, jitter, link quality, etc.) and/or as a path constraint (e.g., prune paths for which a given constraint such as a color of minimum bandwidth, etc.), if not satisfied. In a somewhat similar manner and in the context of a mobility path that represents the roaming transitions of a client device, architecture 500 may utilize mobility path failure metrics to represent the probability of a mobility/roaming failure along a given mobility path. In some embodiments, architecture 500 may also use these metrics as a constraint or in some objective functions, as detailed below.

Another functionality of architecture 500 is the computation of mobility path failure metrics which can be performed, in some embodiments, by a single computational element, such as a PCE. In the case of a wireless Wi-Fi network, roaming events may be tracked by the WLC(s) (e.g., network entities 502) to which the APs are connected. Note that a client device, such as client device 504, may roam between APs connected to different WLCs, in which case, more than one WLC may be involved in tracking roaming events. All roaming events are then collected (e.g., by data collection platform 304) for each client device, to be able to compute mobility paths.

Using the collected data, mobility path analyzer 506 may identify the mobility paths that exist in the network. In some cases, these paths can be distinguished in architecture 500 by user ID, thanks to the authentication steps taken by the mobile devices (e.g., leveraging an ISE), based on MAC addresses, or the like. In one embodiment, mobility path analyzer 506 may first compute the most frequent sub-trajectories of the client devices in the network. For example, mobility path analyzer 506 may apply a machine learning-based clustering approach to the observed client trajectories, such as by using a time series of APs traversed by the clients and computing the most prominently occurring sequences of APs.

Said differently, mobility path analyzer 506 may transform the wireless traces from the monitored network into a mobility graph in which each node represents an AP, and the client device is represented as a hyper-edge on the graph. Using this graph notation, mobility path analyzer 506 may extract the trajectories of the client devices users from wireless traces using heuristic and machine learning approaches. From the extracted trajectories, we leverage ML and other graph algorithms to eliminate noisy paths where the device is oscillating between few APs. In turn, mobility path analyzer 506 may identify the most-frequent sub-trajectories that have been traversed by a large number of clients. Data mining approaches such as frequent pattern mining (e.g., TKS and TPS), can be used to extract most frequent sub-paths.

Figure 6:
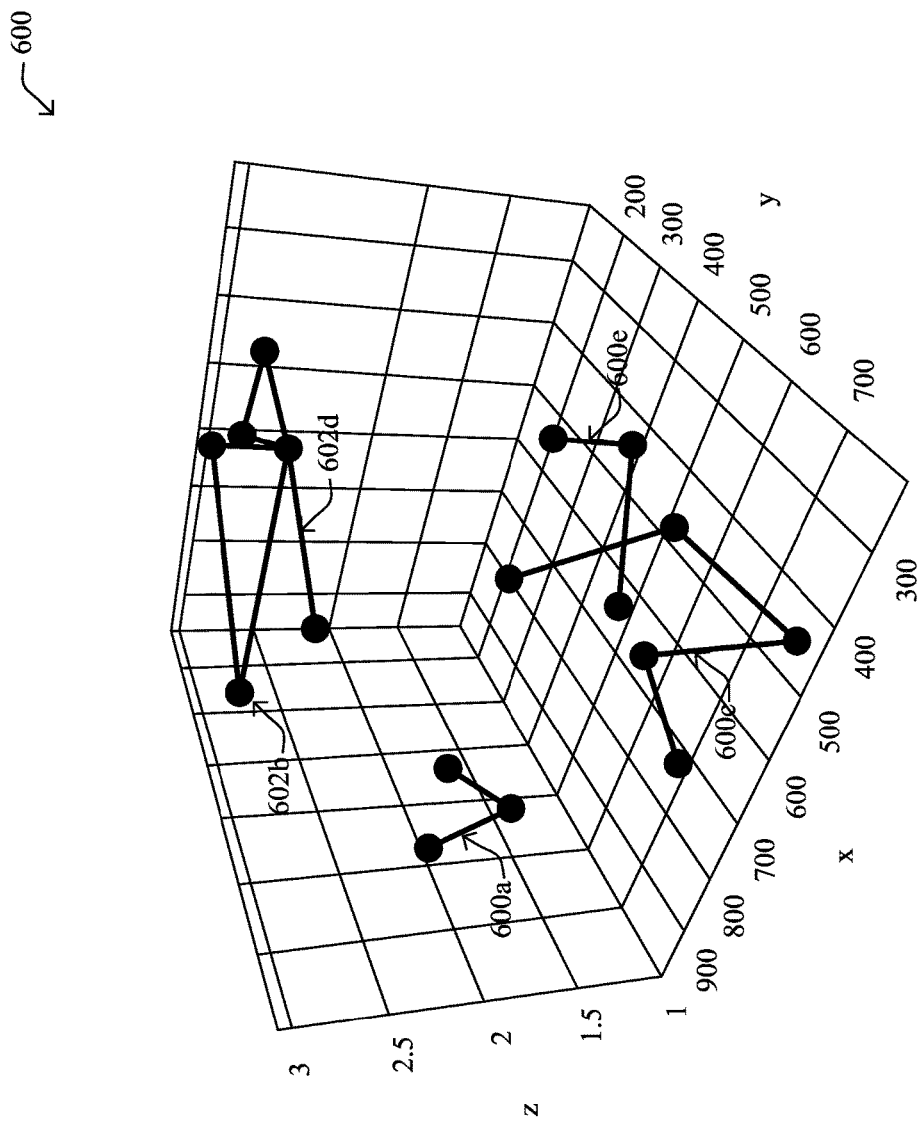
FIG. 6 illustrates examples of mobility paths in three dimensions.

Referring briefly to FIG. 6, examples of mobility paths in three dimensions are shown. Notably, plot 600 illustrates in three dimensions the mobility paths 602*a*-602*e* observed during testing of a wireless network. In some cases, such as with mobility path 602*b* and 602*d*, the client devices may tend to stay at the same z-coordinate, indicating that the client device is likely to roam along a mobility path on a single floor. However, such as in the case of mobility path 602*e*, the client device may roam between APs with different z-coordinates, indicating that the user of the device may have traveled to a different floor. For each of these trajectories (e.g., links between APs in a mobility path), architecture 500 may assess the observed roaming failures and compute mobility failure metrics from these observations. For example, one insight from plot 600 is that the third floor (z=3) has many more failed paths concentrated in one area than that of the first and second floors. In this way, architecture 500 can associate mobility failure metrics to the identified mobility paths.

For each sub-trajectory identified by mobility path analyzer 506, mobility path failure modeler 508 may compute mobility path failure metrics based on the failure events observed over these sub-trajectories (e.g., by examining the distributions of failures, clusters of failures that are commonly occurring, etc.). In some embodiments, the mobility path failure metrics may also be client-specific or associated with a group of clients. In other words, and in sharp contrast to data plane metrics that are independent of the client type, the mobility path failure metrics may also vary with the type of client (e.g., some client devices may have better reception than others, may be more prone to roam, etc.).

Referring again to FIG. 5, in various embodiments, architecture 500 may be further configured to drive client device mobility based on the mobility path failure metrics modeled by mobility path failure modeler 508. In some embodiments, mobility path failure modeler 508 may leverage automation & feedback controller 316 to upload the mobility path information and failure metrics to network entities 502. For example, mobility path failure modeler 508 may upload this information to tables maintained by an AP, gateway, base station, or the like.

In general, given the knowledge of the frequent traversal paths and failed paths of the client devices in the monitored network, architecture 500 can also trigger local reroutes in the mobility paths of the client devices. In one embodiment, mobility path failure modeler 508 predicts the approximate path of travel of client device 504 and its final destination. Based on this predicted path, modeler 508 can compute a list of the most effective alternative mobility paths for client device 504 that are the most failure resistant. In one embodiment, this can be computed by running a shortest path algorithm on the path graph from mobility path analyzer 506. For example, the graph of the network can be computed with edges being weighted using the failure metrics. In turn, modeler 508 can compute "weighted shortest paths" from the same source and destination as that of the failed path. This will yield probable mobility paths with low failures.

Another approach would be to infer the best paths by using machine learning and data-mining. For example, ML-based analyzer 312 can query the client's history of all paths between the client's current AP and final destination. In turn, analyzer 312 can then mine these set of paths to infer the most-frequent paths which had low failures. Local rerouting and next-hop selection can be done based on the shortest path information.

On joining the network, client device 504 may receive mobility path information 510 from the AP to which client device 504 attaches. For example, mobility path information 510 may include a list of mobility paths along with their respective mobility path failure metrics for all potential next hops/APs, to aid client device 504 in its roaming decisions. In particular, client device 504 may use this mobility path failure metric, along with other characteristics, such as a measured RSSI of another AP, to determine whether client device 504 should roam to that AP.

In some cases, mobility path information 510 may be provided to client device 504 on expiration of a given timer, or when there are substantial changes in the mobility path failure metrics. In another embodiment, network entities 502 may dynamically provide mobility path information 510 on being explicitly requested by client device 504. For example, when client device 504 moves from $AP_x$ to $AP_y$, client device 504 may be provided data indicative of the next hop AP and its associated probability of failure or may be provided a list of mobility paths with their respective mobility path failure metrics.

In yet another embodiment, the AP may anticipate which next hops are likely to be visited by client device 504, by using machine learning to predict the mobility path that client device 504 is likely to take. Note that the set of mobility path(s) that client device 504 is predicted to take may also be constrained to APs for which the expected signal quality from client device 504 will be above a given threshold. For example, the most probable, low failure paths can be inferred by mining client device trajectories with a weight on each path that corresponds to the wireless failures observed on that path. Later, sequence mining, such as identifying the top-K subsequences, can be altered not to only account for the most probable sub-sequences, but also for the failures along this path. One adaption of such an approach may be to exclude the edges in the sub-sequence that have faced more than n %, in another embodiment. In turn, these sub-paths can be provided to client device 504 as part of mobility path information 510.

In yet another mode of operation, client device 504 may explicitly request mobility path information 510 from network entities 502 using a custom signaling extension, such as 802.1k/v in the case of a Wi-Fi network. Such a request may indicate, for example, a requested set of mobility paths that are constrained based on their mobility path failure metrics. For example, if client device 504 is associated with a given AP1, client device 504 may request a listing of all of the relevant mobility paths that have a mobility path failure metric that is less than a threshold value. On receiving this listing (e.g., as part of mobility path information 510), client device 504 may use the listing to enhance its AP roaming decisions (e.g., by roaming along a constrained mobility path that satisfies the specified failure metric constraint). Note that such a mode of operation introduces a new approach for mobility in wireless networks whereby machine learning is used by a central PCE to govern mobility, thus effectively influencing/overriding local decisions made by client device 504.

A further aspect of the techniques herein is the ability for architecture 500 to trigger mobility path reroutes for client device 504. In particular, mobility path failure modeler 508 may determine that there is a high chance of mobility failure along the mobility path of client device 504. In turn, mobility path failure modeler 508 may push mobility path information 510 to client device 504 that causes client device 504 to deviate from its current mobility path to a different mobility path.

Figure 7A:
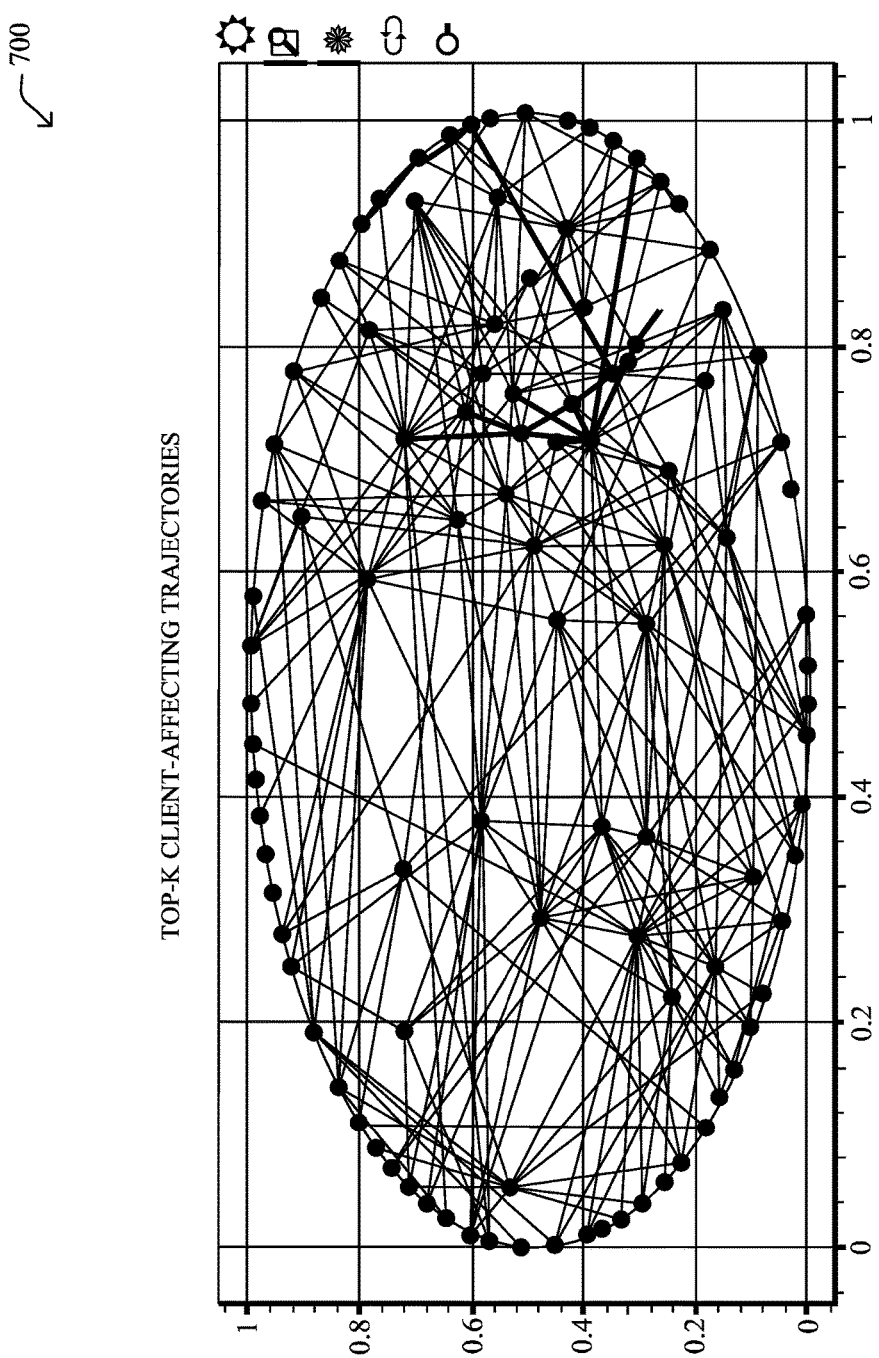
FIGS. 7A-7B illustrate examples of an assessment of client trajectories.
Figure 7B:
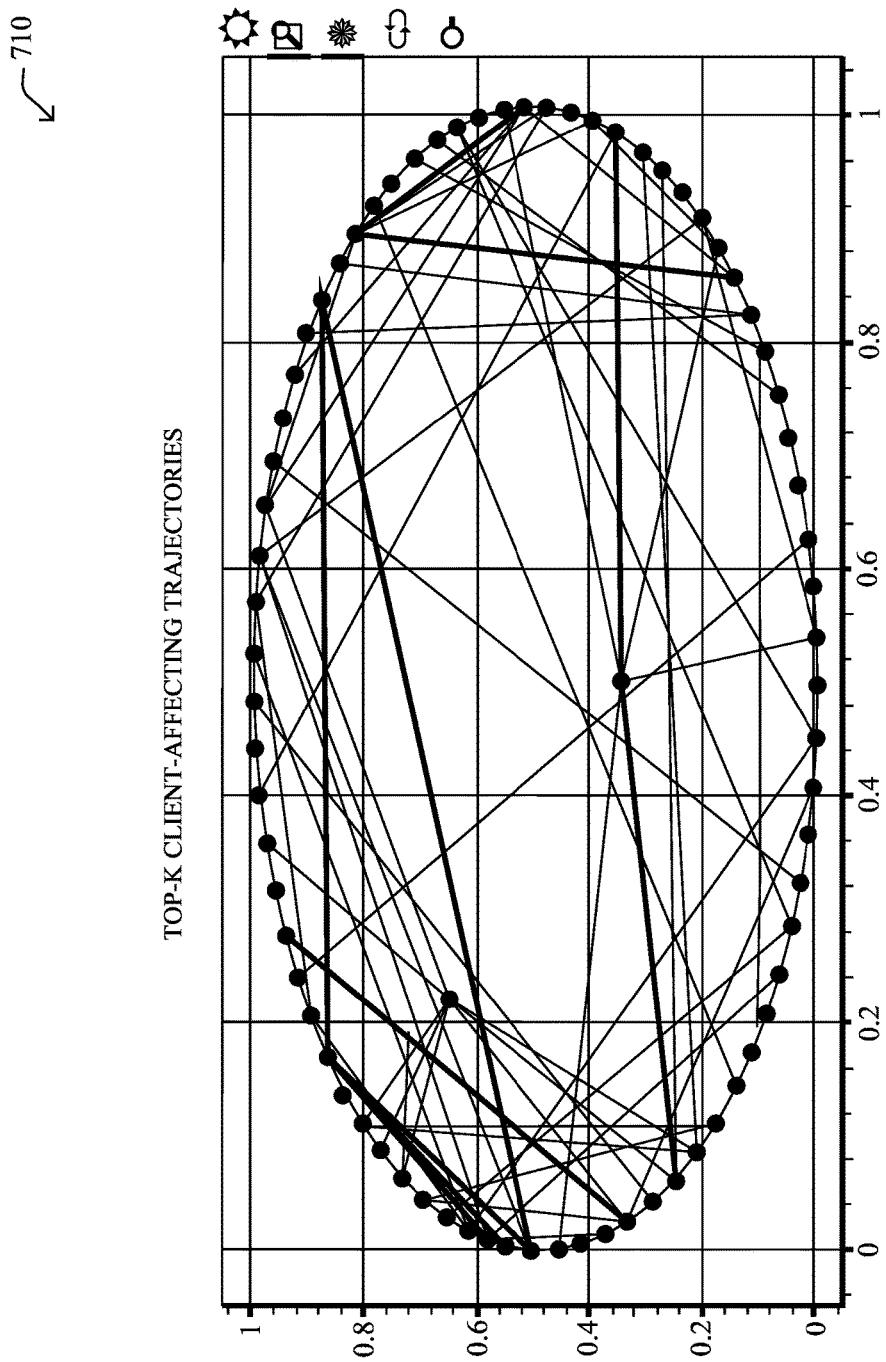

By way of example, plots 700 and 710 in FIGS. 7A-7B illustrate examples of the top-K subsequences/trajectories that affect clients in the network. Notably, plot 700 illustrates a plot of the most failed sub-trajectories along a set of central nodes and plot 710 illustrates the paths in a distributed manner. In other words, plot 700 provides insight that only a few central nodes/APs in the network are responsible for many of the mobility path failures. In plot 710, however, the failures are more distributed among different nodes. From plots 700-710, it can be seen how diverse mobility paths can be in a wireless network and this insight can be leveraged by the network assurance system to assess and predict mobility path failures. As would be appreciated, failures can also be subdivided for purposes of predicting path failure metrics, such as by distinguishing between authentication-related failures and failures related to DHCP server timeouts.

In some embodiments, different approaches for updating mobility path failure metrics may be adopted according to the network topology, so as to avoid oscillation and instability. For example, rerouting client devices along different mobility paths may be load balanced across clients, so as to avoid rerouting too many clients along the same set of APs. In particular, rerouting clients to the same APs may trigger addition mobility path failures because of the additional burden of control plane messages sent when roaming takes place.

Referring again to FIG. 5, another aspect of the techniques herein relates to performing next hop selection on client device 504, according to a set of active applications running on client device 504. Indeed, in most end devices, the action of roaming is not always tied to the set of active applications, but is instead strictly a function of the wireless signal characteristics. In some embodiments, the roaming decision by client device 504 may be governed, not only by the quality of the mobility path measured by the path failure metric introduced herein, but also based on one or more service level agreements (SLAs) of the active application(s) on client device 504. For example, client device 504 may decide not to roam when a potential next hop candidate (providing a better signal strength) belongs to a mobility path with a low path failure metric and real-time applications are active on client device 504 (e.g. a video call, etc.). In one embodiment, ML-based analyzer 312 may compute the path failures and attach the application performance and the failure attributes to the edges. Machine learning approaches, such as trajectory clustering, can then be applied on top of these edges, to infer the most-promising paths for client device 504 for a given set of applications.

In various embodiments, architecture 500 may also leverage feedback regarding any detected roaming failures, to modify the models used in ML-based analyzer 312. Such feedback may be provided by the WLC, as in the case of Wi-Fi networks, but could also be provided by client device 504, itself. In such cases, a protocol extension may be used to signal back when roaming has failed for client device 504. In either case, feedback can then be used to adjust the mobility path failure metric predictions and potentially the underlying ML model used to compute such metrics. Techniques, such as reinforcement learning and active learning, can be used to strengthen the model based on the feedback.

Figure 8:
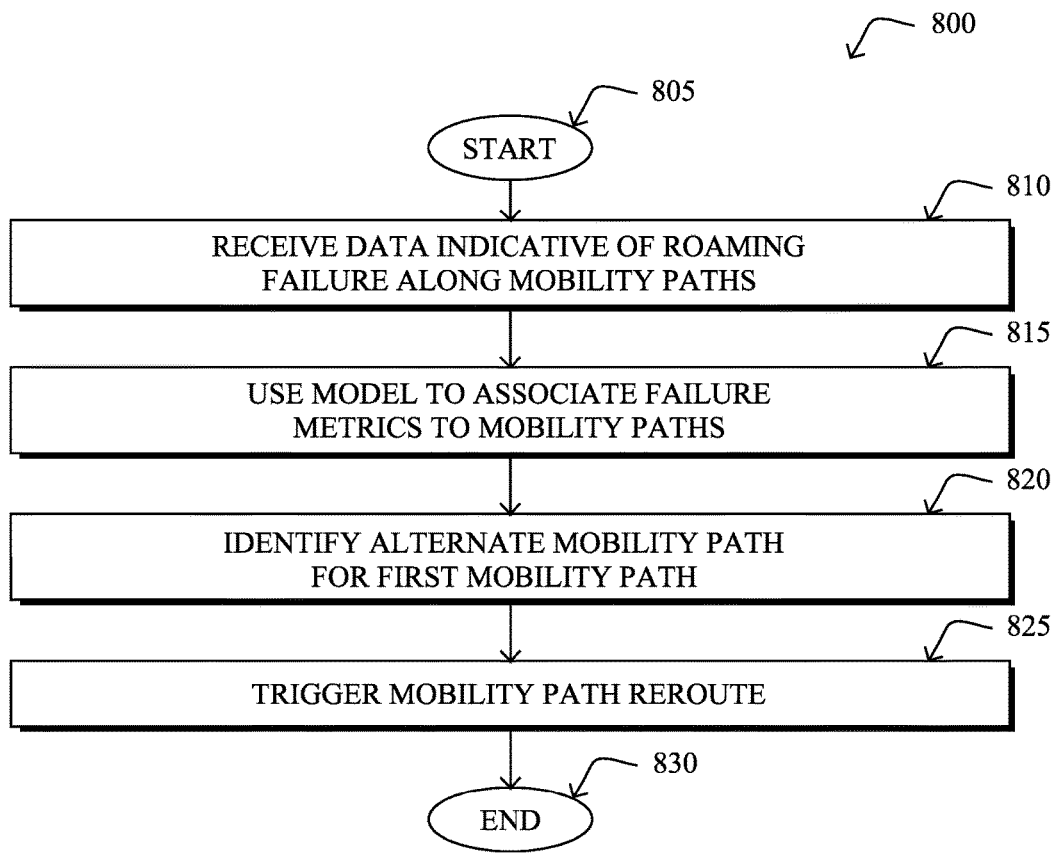
FIG. 8 illustrates an example simplified procedure for triggering a mobility path reroute by a client device.

FIG. 8 illustrates an example simplified procedure for triggering a mobility path reroute by a client device in a network, in accordance with one or more embodiments described herein. For example, a non-generic, specifically configured device (e.g., device 200) may perform procedure 800 by executing stored instructions (e.g., process 248) to provide a service to the network. The procedure 800 may start at step 805, and continues to step 810, where, as described in greater detail above, the service may receive data indicative of roaming failures along mobility paths in a network. In various embodiments, the mobility paths represent ordered series of wireless access points via which wireless clients have accessed the network over time. For example, if client devices in the network are observed to roam from AP 1, to AP 2, to AP 3, a corresponding mobility path may represent these APs as nodes and the roaming transitions as edges between the nodes.

At step 815, as detailed above, the service may use, based on the data indicative of the roaming failures, a machine learning-based model to associate mobility path failure metrics with portions of the mobility paths. In various embodiments, the mobility path failure metrics may quantify the likelihood of a client device traversing a given mobility path experiencing a roaming failure between APs on the mobility path.

At step 820, the service may identify, for a first mobility path, an alternate mobility path that has a lower mobility path failure metric than that of the first mobility path. For example, if the mobility path on which a client device is traversing has a mobility path failure metric above a predefined threshold, this may indicate that the client device is likely to experience a roaming failure on the current mobility path. In turn, the service may identify another mobility path that has a lower path failure metric as an alternate mobility path for the client device.

At step 825, the service may trigger a mobility path reroute for a particular client device in the network on the first mobility path to the alternate mobility path, as described in greater detail above. In some embodiments, the service may trigger the mobility path reroute by sending mobility path information to the client device. For example, such information may indicate one or more mobility paths and their associated mobility path failure metrics, thereby allowing the client device to locally switch to the other mobility path. In further embodiments, the service may receive an indication of a threshold mobility path failure metric for the client device and trigger the reroute based on the first path's failure metric being below this threshold. For example, the types of applications running on the device may require a certain degree of continuous connectivity (e.g., conferencing applications, etc.), thus requiring a mobility path having a low chance of roaming failures. Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, dramatically improve the user experience in wireless networks, effectively avoiding a large number of roaming failures.

While there have been shown and described illustrative embodiments that provide for dynamic rerouting of wireless traffic based on input from ML-based mobility path analysis, it is to be understood that various other adaptations and modifications may be made within the spirit and scope of the embodiments herein. For example, while certain embodiments are described herein with respect to using certain models for purposes of predicting mobility path failure metrics, the models are not limited as such and may be used for other functions, in other embodiments. In addition, while certain wireless protocols are shown, such as Wi-Fi, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
  receiving, at a service, data indicative of roaming failures along mobility paths in a network, wherein the mobility paths represent ordered series of wireless access points via which wireless clients have accessed the network over time;
  using, by the service and based on the data indicative of the roaming failures, a machine learning-based model to associate mobility path failure metrics with portions of the mobility paths;
  receiving, at the service, a threshold mobility path failure metric from the particular client device;
  identifying, by the service and for a first mobility path, an alternate mobility path that has a lower mobility path failure metric than that of the first mobility path based on an output from the machine learning model; and
  triggering, by the service, a mobility path reroute for a particular client device in the network on the first mobility path to the alternate mobility path based in part on a determination that the mobility path metric associated with the alternate mobility path is lower than the received threshold.

2. The method as in claim 1, wherein triggering the mobility path reroute comprises:
  sending, by the service, data indicative of the alternate mobility path to the particular client device via an access point in the network, wherein the data indicative of the alternate mobility path causes the particular client device to roam to an access point along the alternate mobility path.

3. The method as in claim 2, wherein the data indicative of the alternate mobility path comprises at least one mobility path metric associated with the alternate mobility path.

4. The method as in claim 1, further comprising:
  receiving, by the service and from the particular client device, an indication that the particular client device experienced a roaming failure along the alternate mobility path; and
  modifying, by the service, the machine learning-based model based on the received indication that the particular client device experienced a roaming failure along the alternate mobility path.

5. The method as in claim 1, wherein a mobility failure corresponds to a traffic disruption experienced by one of the client devices caused by a failure to roam between wireless access points.

6. The method as in claim 1, wherein the mobility path reroute is triggered in part based on one or more service level agreements (SLAs) associated with one or more active applications on the particular client device.

7. The method as in claim 1, wherein the wireless access points are Wi-Fi access points.

8. The method as in claim 1, further comprising:
computing, by the service, the mobility paths in the network in part by clustering trajectories of the client devices between the access points in the network.

9. An apparatus comprising:
one or more network interfaces to communicate with a network;
a processor coupled to the network interfaces and configured to execute one or more processes; and
a memory configured to store a process executable by the processor, the process when executed configured to:
receive data indicative of roaming failures along mobility paths in the network, wherein the mobility paths represent ordered series of wireless access points via which wireless clients have accessed the network over time;
use, based on the data indicative of the roaming failures, a machine learning-based model to associate mobility path failure metrics with portions of the mobility paths;
receive a threshold mobility path failure metric from the particular client device;
identify, for a first mobility path, an alternate mobility path that has a lower mobility path failure metric than that of the first mobility path based on an output from the machine learning model; and
trigger a mobility path reroute for a particular client device in the network on the first mobility path to the alternate mobility path based in part on a determination that the mobility path metric associated with the alternate mobility path is lower than the received threshold.

10. The apparatus as in claim 9, wherein the apparatus triggers the mobility path reroute by:
sending data indicative of the alternate mobility path to the particular client device via an access point in the network, wherein the data indicative of the alternate mobility path causes the particular client device to roam to an access point along the alternate mobility path.

11. The apparatus as in claim 10, wherein the data indicative of the alternate mobility path comprises at least one mobility path metric associated with the alternate mobility path.

12. The apparatus as in claim 9, wherein the process when executed is further configured to:
receive, from the particular client device, an indication that the particular client device experienced a roaming failure along the alternate mobility path; and
modify the machine learning-based model based on the received indication that the particular client device experienced a roaming failure along the alternate mobility path.

13. The apparatus as in claim 9, wherein a mobility failure corresponds to a traffic disruption experienced by one of the client devices caused by a failure to roam between wireless access points.

14. The apparatus as in claim 9, wherein the mobility path reroute is triggered in part based on one or more service level agreements (SLAs) associated with one or more active applications on the particular client device.

15. The apparatus as in claim 9, wherein the wireless access points are Wi-Fi access points.

16. The apparatus as in claim 9, wherein the process when executed is further configured to:
computing, by the service, the mobility paths in the network in part by clustering trajectories of the client devices between the access points in the network.

17. A tangible, non-transitory, computer-readable medium storing program instructions that cause a device to execute a process comprising:
receiving data indicative of roaming failures along mobility paths in a network, wherein the mobility paths represent ordered series of wireless access points via which wireless clients have accessed the network over time;
using, based on the data indicative of the roaming failures, a machine learning-based model to associate mobility path failure metrics with portions of the mobility paths;
receiving a threshold mobility path failure metric from the particular client device;
identifying, for a first mobility path, an alternate mobility path that has a lower mobility path failure metric than that of the first mobility path based on an output from the machine learning model; and
triggering a mobility path reroute for a particular client device in the network on the first mobility path to the alternate mobility path based in part on a determination that the mobility path metric associated with the alternate mobility path is lower than the received threshold.

18. The computer-readable medium as in claim 17, wherein the process further comprises:
receiving, from the particular client device, an indication that the particular client device experienced a roaming failure along the alternate mobility path; and
modifying the machine learning-based model based on the received indication that the particular client device experienced a roaming failure along the alternate mobility path.

* * * * *